United States Patent [19]

Stubbs

[11] Patent Number: 4,528,861
[45] Date of Patent: Jul. 16, 1985

[54] CONSTANT MESH GEARBOXES

[75] Inventor: Peter W. R. Stubbs, Hampton Magna, England

[73] Assignee: BL Technology Limited, England

[21] Appl. No.: 362,291

[22] Filed: Mar. 26, 1982

[30] Foreign Application Priority Data

Mar. 26, 1981 [EP] European Pat. Off. ........ 81301295.2

[51] Int. Cl.³ .......................... F16H 3/08; F16D 31/00
[52] U.S. Cl. ..................................... 74/364; 192/58 R
[58] Field of Search ..................... 192/58 R, 60, 61; 74/752 C, 339, 340, 333, 334, 364, 370

[56] References Cited

U.S. PATENT DOCUMENTS

| 2,552,010 | 5/1951 | Marsell | 192/61 X |
| 2,855,761 | 10/1958 | Jacobs | 192/60 X |
| 3,049,207 | 8/1962 | Maier | 192/58 R |
| 3,099,925 | 8/1963 | Leonard | 192/61 X |
| 3,202,005 | 8/1965 | Ivanchich | 74/333 |
| 3,274,857 | 9/1966 | Brunot | 74/752 C |
| 4,078,453 | 3/1978 | Brace | 192/61 X |
| 4,278,157 | 7/1981 | King | 192/58 R |
| 4,322,988 | 4/1982 | Hill | 192/61 X |
| 4,333,555 | 6/1982 | Gogins | 192/58 R |

FOREIGN PATENT DOCUMENTS

| 2735910 | 11/1978 | Fed. Rep. of Germany . | |
| 642294 | 7/1962 | Italy | 74/364 |
| 523771 | 7/1940 | United Kingdom | 74/364 |
| 889945 | 12/1981 | U.S.S.R. | 192/60 |

Primary Examiner—Allan D. Herrmann
Assistant Examiner—Arthur T. Quiray
Attorney, Agent, or Firm—Hayes, Davis & Soloway

[57] ABSTRACT

A constant mesh parallel shaft gearbox providing a plurality of ratios has its ratio controlled by having, in place of conventional synchronizer assemblies and dog clutches, rotary positive displacement pumps each having one element (4) connected to the gearbox shaft (2) and another (3) connected to a gear (1). With the pump recirculating fluid the gear (1) freewheels on the shaft (2), a valve ring (9) can prevent recirculation and hence lock the gear for rotation with the shaft. Unidirectional rotation of the gear on the shaft in each direction can be obtained passing pump flow through non-return valves 13 or 14. The invention is equally applicable to epicyclic gearboxes and where brake bands, for example, can be replaced by a rotary pump and valve in accordance with the invention.

12 Claims, 5 Drawing Figures

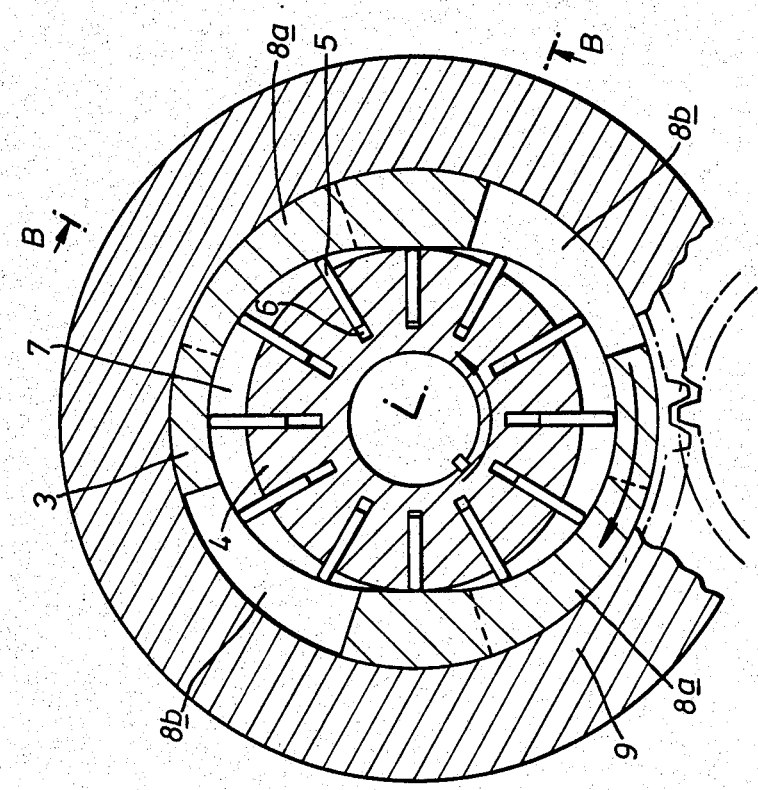
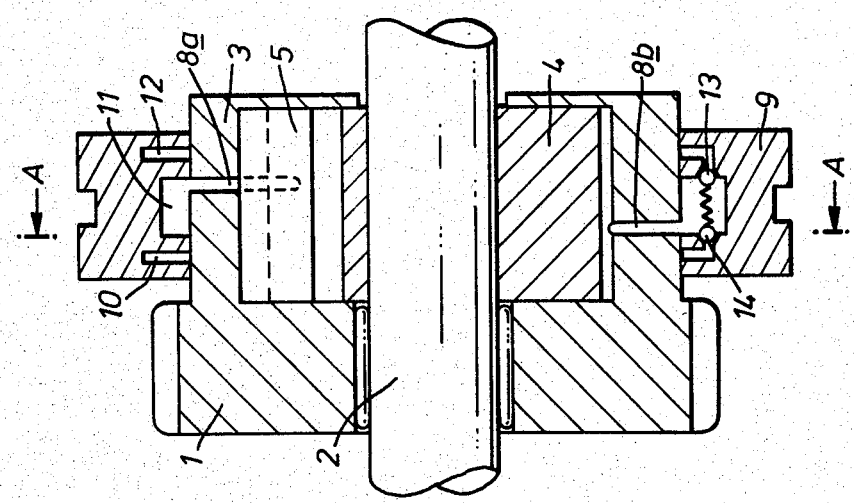

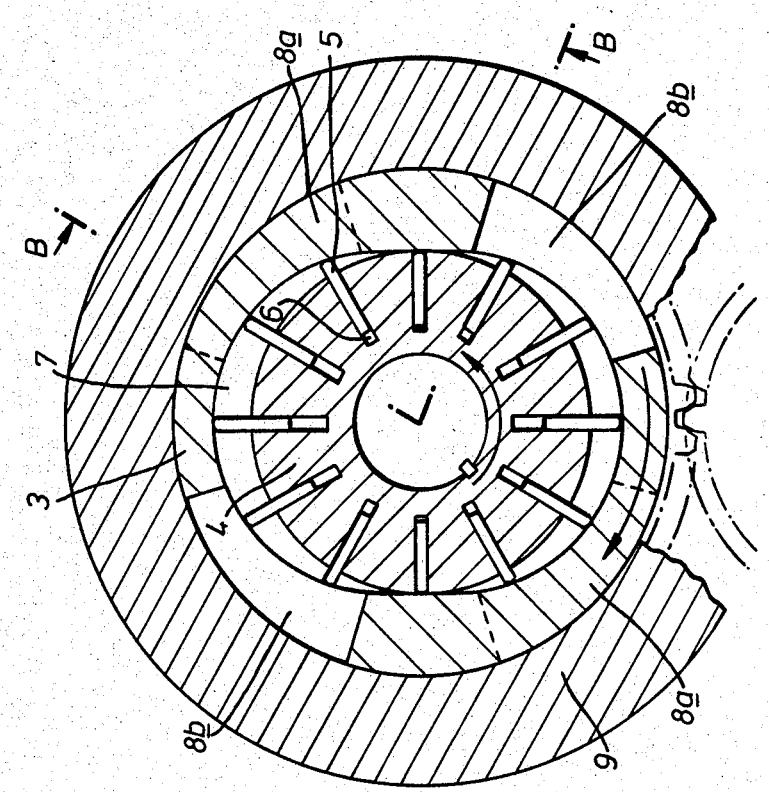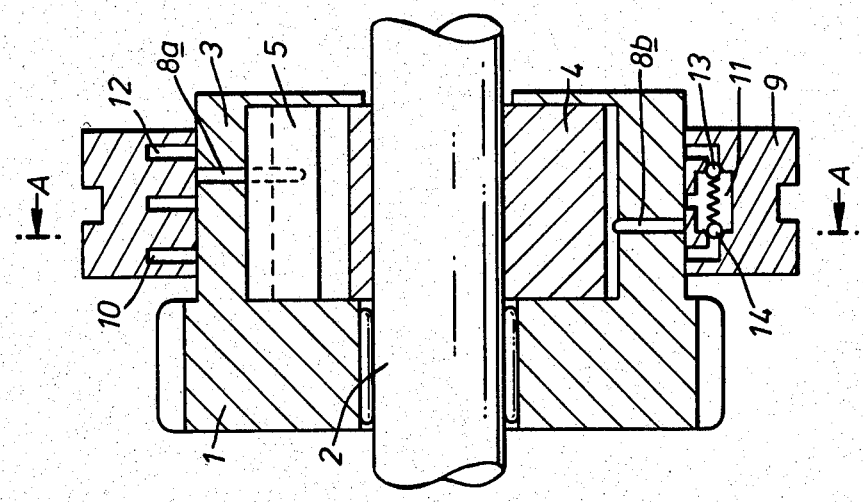

CONSTANT MESH GEARBOXES

The type of gearbox is well known, particularly in automotive use, where a number of speed ratios is provided, any one of which can be selected by the driver as required. A common form of this type is the so called constant mesh gearbox where all the gearsets are permanently meshed with each other but of the gearset for each speed ratio, one gear normally rotates freely on its shaft, so that no drive is transmitted. To engage a given ratio, the appropriate freely rotating gear is locked to its shaft by a dog clutch whose engagement may also be controlled by a known synchroniser system which gives silent engagement of the dog clutch teeth by ensuring that no relative motion exists between the dog clutch teeth before engagement takes place.

The invention provides a constant mesh gearbox including at least two pairs of permanently meshed gears, wherein at least one of said pairs has a gear mounted for rotation on a shaft, said gear being coupled for rotation with one element of a rotary positive displacement pump, said shaft being coupled for rotation with another element of said pump, relative rotation of said pump elements causing said pump to operate, and valve means arranged to control the flow of fluid produced by said pump and thereby control relative rotation of said gear and said shaft.

Thus the pump controlled by the valve means can operate simply as a substitute for the dog clutch.

Preferably, however, the invention provides a constant mesh gearbox as described above, wherein said valve means comprises a one way valve arranged to permit relative rotation of said gear and said shaft in one direction and to substantially prevent relative rotation in the other direction. Thus the invention may provide a free-wheeling action between the gear and the shaft. Under some circumstances it may be desirable for the valve means to enable the free-wheel to be locked-up, and to enable free-wheeling to take place selectively in either direction of rotation.

The free-wheeling action is of great advantage when the control of such a gearbox is made automatic. If automatic control is required on a dog clutch type gearbox, it is necessary to unload the dog teeth to permit disengagement of one ratio and the disengagement must be completed before the next ratio is engaged. Thus a strict timing of the sequence power off, disengage, engage, power on has to be provided and no power can be transmitted between prime mover and load while this is happening.

An exemplary embodiment of the invention will now be described with reference to the accompanying drawings, in which:

FIG. 1 shows side and end views in cross-section of a gear and an associated rotary pump mounted on a shaft in a constant mesh gearbox in accordance with the invention.

FIG. 1A shows a side view and FIG. 1B shows an end view for FIG. 1 shows side and end views.

FIG. 2 shows side and end views, similar to those of FIG. 1, of an alternative embodiment of the invention;

FIG. 2A shows a side view and FIG. 2B shows an end view for FIG. 2 shows side and end views.

Figure 3:
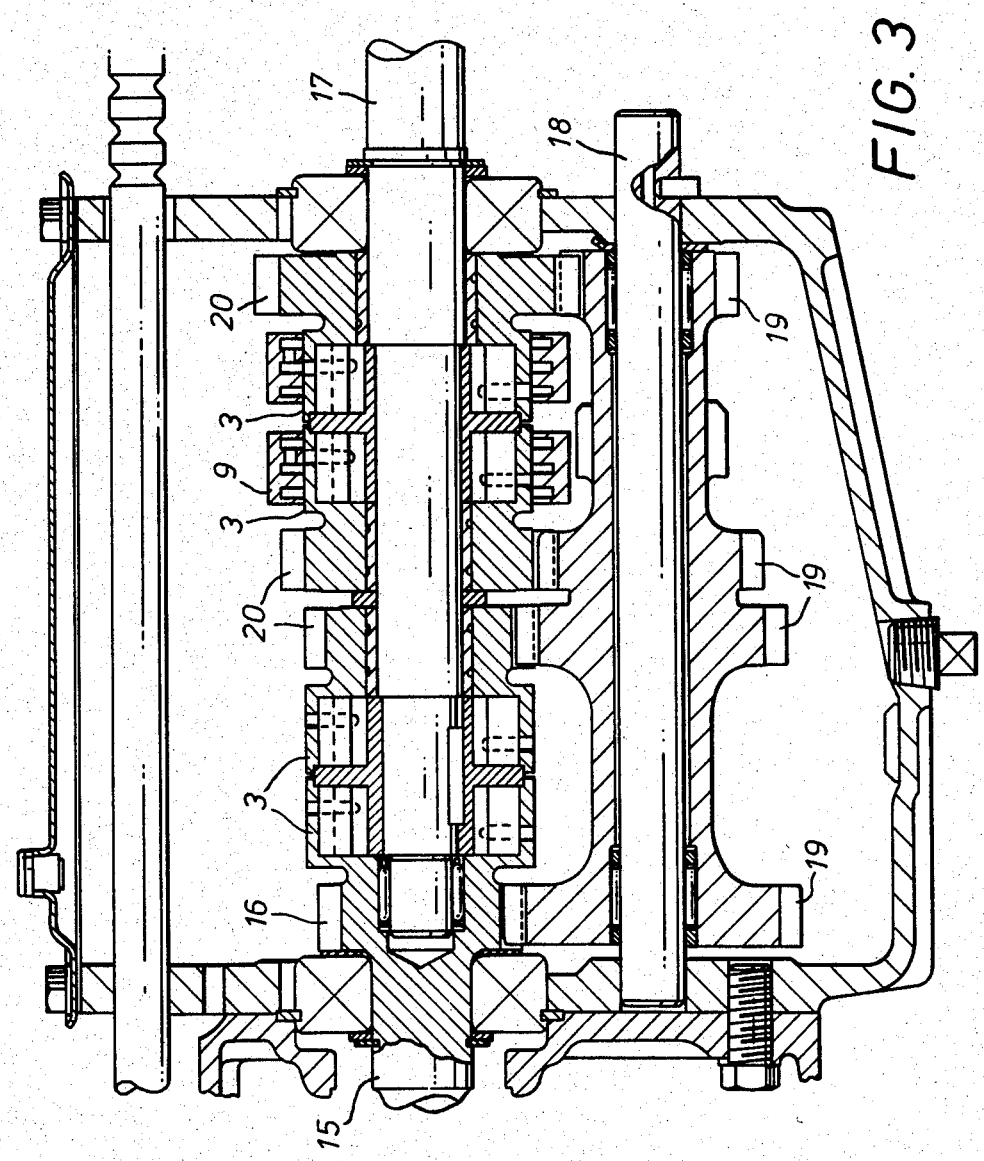
FIG. 3 shows a constant mesh gearbox in accordance with the invention.

FIG. 1, shows the free running gear 1 of a constant mesh pair journalled on its shaft 2. Attached to the gear 1 is the housing 3 of a hydraulic device and attached to the shaft 2 is the hydraulic rotor 4 of the device. The housing 3 and the rotor 4 correspond to the similarly named components of a vane type positive displacement hydraulic pump and, as in the pump, a plurality of vanes 5 are mounted in equispaced slots 6 in the rotor as shown. In such a pump, the relative shapes of the internal surface of housing 3 and rotor 4 are designed to form one or more diverging/converging cavities 7 of which two are provided in the embodiment illustrated. These are divided up by the vanes 5 as shown and when relative rotation occurs between housing 3 and rotor 4 in the directions shown by the arrows, a pumping action is set up whereby working fluid, eg oil can be drawn into the diverging sections of the cavities through ports 8a and delivered from the converging sections, through similar ports 8b. Which ports are inlet and which outlet depends on the direction of relative rotation of housing 3 and rotor 4, and if the relative rotation is reversed, the roles of ports 8a and 8b are reversed also. The operation of this part of the device is therefore similar to that of a vane type pump and detail design features developed for such pumps are equally applicable here. The invention is not restricted to the use of a vane type pump, any positive displacement pumping device having a high enough efficiency can be used.

Surrounding the housing 3 is a valve ring 9 which rotates with the housing 3 but may slide axially relative to it. The valve ring 9 can be similar in form to the coupling sleeve of a synchromesh gearbox and can be operated by a system of rods and forks similar to that of the synchromesh gearbox, or by other means including power servos. The function of the valve ring is to control the pumping of the hydraulic device, and its operation will now be described.

FIG. 1 shows the valve ring in its central position. Three annular grooves, 10, 11, 12 are formed inside the ring, and with the ring in its central position as shown, ports 8a and 8b are interconnected, allowing relative rotation between housing 3 and rotor 4 to occur freely. When the ring is moved to the left, port 8a communicates with groove 12 whilst port 8b remains connected to groove 11. A non-return valve 13 placed between grooves 11 and 12 allows oil to flow from groove 12 into groove 11 but not vice versa, which in turn permits relative rotation between housing 3 and rotor 4 to occur freely in one direction but prevents it by hydraulic lock in the other. When the ring is moved to the right, port 8b communicates with groove 10 and port 8a remains connected to groove 11. Non-return valve 14 then allows oil to flow from groove 10 to groove 11 but not vice versa and hence permits relative rotation between housing 3 and rotor 4 in the opposite sense to that permitted when ring 9 is moved to the left.

FIG. 2 shows an alternative arrangement where with the ring in its central position no flow is permitted between ports 8a and 8b and hence no relative rotation can occur between housing 3 and rotor 4 in either direction, because of hydraulic locking. With the ring displaced to left or right, the function is similar to the arrangement of FIG. 1.

Obviously, other combinations of the valve ring configurations shown in FIGS. 1 and 2 can be used to give the required control of the relative rotations between housing 3 and rotor 4.

The above description shows how the proposed device controls the relative rotation between a gear and its shaft. FIG. 3 shows a gearbox in accordance with the invention, comprising an input shaft 15 connected to an input gear 16, an output shaft 17 rotatable relative to the input shaft 15, and a layshaft 18 carrying four gears 19. One of the gears 19 meshes with input gear 16, the remaining gears 19 each mesh with a respective gear 20 rotatably mounted on output shaft 17. Integral with each of the gears 16 and 20 is a respective housing 3 of a hydraulic device as described above. Only two of the four valve rings 9 are shown, for clarity. The hydraulic devices are each selectively operable by selector forks 10 (not shown) such that gear 16 and thus input shaft 15, or any one of the gears 20, may be locked for rotation with the output shaft 17. It will thus be seen that the gearbox is similar to a conventional constant mesh gearbox but has hydraulic devices in place of the conventional synchroniser and dog clutch assemblies.

Assuming the assemblies used were all of the type shown in FIG. 2, the operation of the gearbox would be as follows:

NEUTRAL

All assemblies set to allow the gears 16 and 20 to overrun the shaft 17 in the forward sense.

STARTING

The gear required for starting (normally the right-hand gear 20 shown in FIG. 3) would be engaged by moving the valve ring 9 to its central position. If the starting gear is not the lowest ratio available, the valve rings of those having lower ratios will be set to allow the shaft to overrun the gear. The vehicle is then started by any conventional starting device (e.g. pedal operated friction clutch) located between input shaft 15 and the vehicle's engine.

UPSHIFTING

Prior to an upshift, the valve ring of the presently engaged gear is set to allow the shaft to overrun the gear. The upshift is effected by moving the valve ring of the higher gear to its central position to lock the gear to the shaft. This sequence is repeated until the highest gear is reached. It is an important feature that during this process it is not necessary to operate a disconnect clutch to relieve load on the gears, or even to interrupt the power flow, as with conventional transmissions. As the valve ring of the higher gear is moved to its central position, the oil flow between ports 8a and 8b will be progressively cut off and torque will progressively be transmitted from gear 1 to shaft 2 as the hydraulic pressure in cavities 7 increases.

DOWNSHIFTING

Downshifting follows the exact sequence for upshifting but in reverse. Again no disconnection of drive is needed and driving torque is transferred smoothly from one gear pair to the other.

Whilst both embodiments show arrangements having a free-wheeling action, presently obtained by means of non-return valves, a simpler arrangement is possible within the scope of the invention. The valve ring may be designed to provide a simple on or off connection between the inlet and the outlet of pumping device, thereby providing a simple hydraulic equivalent to the dog clutch.

Again, while the hydraulic devices of the embodiment act between a gear and the shaft bearing it, the devices could be coupled differently. For example the device associated with gear 16 could have its rotor connected to the adjacent gear 20 instead of the shaft; as in the illustrated embodiment, stalling the pump flow would serve to change the ratio.

Moreover, whilst the invention is particularly suited to gearboxes employing spur gears as shown, it could be applied to other constant mesh arrangements, such as those employing epicyclic gearing wherein the brakes and clutches commonly used could be replaced by hydraulic devices similar to those described above.

I claim:

1. A constant mesh gearbox having a plurality of constantly meshed gears which provide a plurality of alternative transmission ratios between a gearbox input means and a gearbox output means, comprising a rotary positive displacement pump connected to at least one gear on a shaft, said gear being coupled for rotation with one element of said pump, said shaft being coupled for rotation with another element of said pump, and valve means operable as a reversible one-way valve to permit pump operation selectively in one direction or the opposite direction only to permit relative rotation of said gear and said shaft in said one direction or said opposite direction and to substantially prevent relative rotation in said opposite direction, or said one direction, respectively.

2. A gearbox as claimed in claim 1, wherein said valve means is operable to substantially prevent said pump from producing a flow of fluid, to substantially prevent relative rotation of the pump elements.

3. A gearbox as claimed in claim 1, wherein said valve means can permit said pump to operate in opposite directions.

4. A gearbox as claimed in claim 1, comprising at least two said gearsets of permanently meshed spur gears.

5. A motor vehicle having a gearbox according to claim 1.

6. A motor vehicle having a gearbox according to claim 4.

7. A constant mesh gearbox having a plurality of constantly meshed gears which provide a plurality of alternative transmission ratios between a gearbox input means and a gearbox output means, comprising a rotary positive displacement pump connected to at least one gear on a shaft, said gear being coupled for rotation with one element of said pump, said shaft being coupled for rotation with another element of said pump, and valve means selectively operable as a one-way valve to permit pump operation in one direction only to permit relative roatation of said gear and said shaft in one direction and to substantially prevent relative rotation in the other direction, and operable to substantially prevent said pump from producing a flow of fluid to substantially prevent relative rotation of the pump elements, said valve means providing, in sequence, pump operation in one direction only, in neither direction and in a direction opposite to said one direction only.

8. A constant mesh gearbox having a plurality of constantly meshed gears which provide a plurality of alternative transmission ratios between a gearbox input means and a gearbox output means, comprising a rotary positive displacement pump connected to at least one gear on a shaft, said gear being coupled for rotation with one element of said pump, said shaft being coupled for rotation with another element of said pump, and valve means selectively operable as a one-way valve to permit pump operation in one direction only to permit relative rotation of said gear and said shaft in one direction and to substantially prevent relative rotation in the other direction, and operable to permit said pump to operate in opposite directions said valve means permitting, in sequence, pump operation in one of said opposite directions only, in both directions and in the other of said opposite directions only.

9. A gearbox as claimed in claim 7, comprising at least two said gearsets of permanently meshed spur gears.

10. A gearbox as claimed in claim 8, comprising at least two said gearsets of permanently meshed spur gears.

11. A motor vehicle having a gearbox according to claim 7.

12. A motor vehicle having a gearbox according to claim 8.

* * * * *